June 9, 1925.
W. B. UIHLEIN
DEALCOHOLIZING PROCESS
Original Filed Feb. 4. 1918
1,541,296
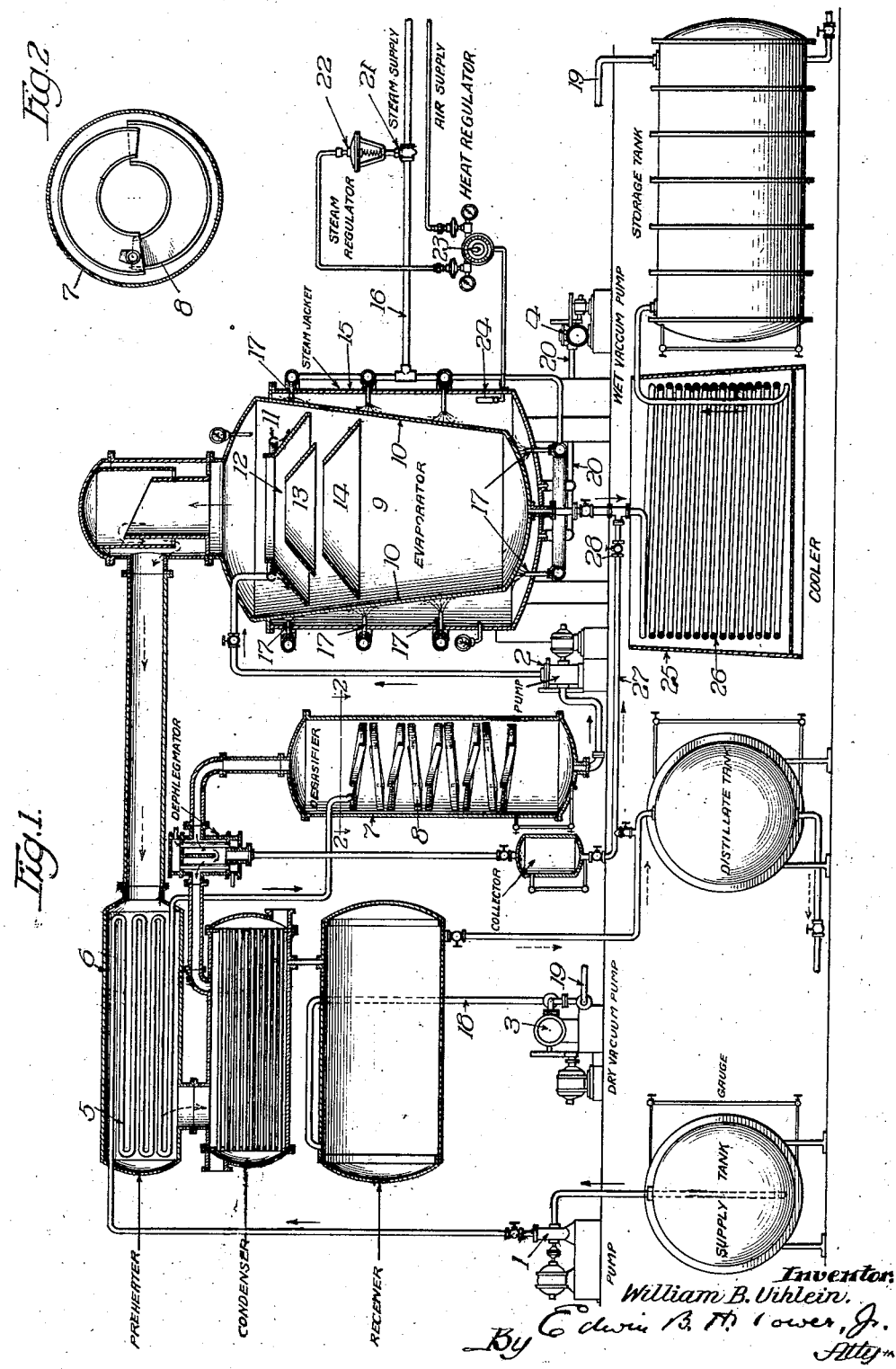

Patented June 9, 1925.

1,541,296

UNITED STATES PATENT OFFICE.

WILLIAM B. UIHLEIN, OF MILWAUKEE, WISCONSIN.

DEALCOHOLIZING PROCESS.

Continuation of application Serial No. 215,273, filed February 4, 1918. This application filed January 19, 1923. Serial No. 613,777.

*To all whom it may concern:*

Be it known that I, WILLIAM B. UIHLEIN, a citizen of the United States, residing at Milwaukee, in the county of Milwaukee and State of Wisconsin, have invented new and useful Improvements in Dealcoholizing Processes, of which the following is a specification.

This invention relates to a dealcoholizing process.

It is particularly adapted to dealcoholize beer and thereby produce a dealcoholized beer, but it may be employed to treat or dealcoholize other beverages or adapted to other purposes.

This application is a continuation of copending application Serial No. 215,273, filed February 4, 1918.

Apparatus for performing the process disclosed herein is set forth and claimed in co-pending application Serial No. 613,778, filed January 19, 1923.

The previous processes merely comprehended passing the beer through a vacuum and simultaneously heating it to volatilize and thereby remove its alcohol.

If the beer in being dealcoholized is heated, even momentarily, to an excessive or high temperature, or heated an undue time to a lower temperature, its color, flavor and characteristics become impaired due to loss of essential aromatics, caramelization of solid ingredients, excessive concentration and other detrimental effects upon its constituents.

In order to produce dealcoholization to the required extent in a given time, heat has to be imparted at a given rate for a given time, the time being dependent upon the rate at which the heat is imparted.

Steam and hot water have both been tried to heat and thereby dealcoholize the beer.

Steam, due to its latent heat, delivers heat at a high rate and produces practically instantaneous dealcoholization, but its temperature is so high, over two hundred and twelve degrees Fahrenheit (212° F.), that the beer is heated to an excessive or high temperature.

Hot water has a lower temperature but delivers heat at such a low rate that the beer has to be heated an undue time.

The object of this invention is to provide a process by which sufficient heat will be imparted to the beer under a low temperature to produce practically instantaneous dealcoholization thereof.

Another object is to provide a process which will produce from an alcoholic beer a dealcoholized or nonalcoholic beer which has substantially the same color, flavor and characteristics as the original beer.

Another object is to provide a process which will expeditiously, economically and commercially dealcoholize beer.

Other objects, purposes and advantages of this invention will appear from the process hereinafter disclosed.

In accordance with this invention, the beer is rapidly passed through a high vacuum, and simultaneously heat is momentarily imparted thereto at a high rate under a low temperature.

Steam is ordinarily employed to heat the beer as it may be kept at a low temperature under a high vacuum but will impart heat at a high rate on account of the high latent heat which it delivers upon being condensed.

As the beer is heated only momentarily and the temperature to which it is raised is low, its color, flavor, and other characteristics are practically unimpaired.

The heat may be applied from the steam to the beer at a high rate under a low temperature in various ways, the purpose being to raise the temperature of the beer only sufficiently to remove its alcohol under a high vacuum.

The beer is ordinarily preheated and degasified before it is dealcoholized, and then, after it has been heated and dealcoholized, it is immediately cooled.

It is preheated to lessen the time and heat required for its dealcoholization and to facilitate its degasification.

It is degasified to keep it from producing excessive foam which would interfere with its dealcoholization.

It is cooled immediately after it is dealcoholized to keep it from remaining at a temperature which might eventually impair its characteristics.

The invention resides primarily in rapidly passing the beer through a high vacuum and momentarily heating it therein by heat imparted thereto at a high rate under a low temperature.

Ordinarily, the beer rapidly passes through a high vacuum, about 26½ inches, and the steam is kept under a vacuum, about 24 inches, so that the steam temperature is about one hundred and thirty-five degrees Fahrenheit (135° F.), and the beer is only raised to a temperature of about one hundred and fifteen degrees Fahrenheit (115° F.).

The beer is preheated from about forty degrees Fahrenheit (40° F.) to about ninety degrees Fahrenheit (90° F.) before it is heated to be dealcoholized.

The dealcoholized beer is immediately cooled to about forty degrees Fahrenheit (40° F.).

Of course, these vacuums and temperatures may vary under different conditions.

This process may be performed by the apparatus which is shown in the accompanying drawing and will now be described, but of course, other apparatus may be employed.

The views in the drawing are as follows:

Fig. 1 is a schematic elevation of the entire apparatus.

Fig. 2 is a cross-sectional view of the degasifier on the line 2—2 of Fig. 1.

This apparatus comprises in general, the following main appliances designated by name upon the drawing:
(a) Preheater.
(b) Degasifier.
(c) Evaporator.
(d) Cooler.
(e) Vacuum pumps.

The auxiliary appliances which may be associated therewith are also designated by name upon the drawing.

The main and auxiliary appliances are connected together by pipes in the way shown in the drawing.

The beer passes from the supply tank through the preheater, the degasifier, the evaporator and the cooler to the storage tank, it being carried from the supply tank to the preheater by the force pump 1 and from the degasifier to the evaporator by the force pump 2.

The beer in being dealcoholized is kept under a high vacuum by a vacuum pump 3 to enable its alcohol to be removed at a low temperature, and the steam for heating the beer is likewise kept under a high vacuum by a vacuum pump 4 so its temperature will be low.

The various appliances will now be separately considered and explained.

Preheater.

The preheater has a sinuous pipe 5 through which the beer passes, and it is enclosed within a jacket 6 which is connected to the evaporator.

The heated vapors from the evaporator pass through the jacket and about the pipe and thereby preheat the beer before it is degasified and dealcoholized.

The beer is preheated to lessen the time and heat required for dealcoholization and to facilitate its degasification.

Degasifier.

The degasifier has a cylindrical degasifying chamber 7 in which are arranged troughs 8, and this chamber has a top outlet for the gas and a bottom outlet for the beer.

The troughs are semi-circular and are arranged spirally in such a way that the beer which is delivered to the top trough flows through the troughs successively and falls from each trough to the next trough until it leaves the bottom trough.

The agitation which the beer receives in falling from one trough to another frees its carbonic acid gas which separates from the beer and ascends to the gas outlet.

The beer is degasified sufficiently to keep it from producing excessive foam in the evaporator.

Evaporator.

The evaporator has a heating chamber 9 which has a vertically inclined wall 10. This wall provides an interior heating surface down which the beer runs in the form of a thin film or stream to be heated and thereby dealcoholized.

The beer enters the evaporator through a circular spreader 11 which is provided with holes or apertures, and then it passes over an inclined circular shed 12 to the heating surface or wall and thereby spread into a continuous thin film or stream.

Various other ways may be adopted to spread, disperse or diffuse the beer to facilitate its being heated and dealcoholized and to increase the quantity thereof that may be dealcoholized in a given time under a given heat.

The deflectors 13 and 14 arranged below the shed direct the ascending alcoholic vapors to the center and away from the incoming and descending beer.

The heating chamber is surrounded by a steam jacket 15 to which steam is delivered from a steam pipe 16 through nozzles 17.

These nozzles are located or disposed in such a way as to distribute the steam throughout the steam jacket and around the side walls and bottom of the heating chamber, and the amount of steam admitted therethrough may be adjusted in any suitable way.

The evaporator has a high vacuum, for instance about 26½ inches, maintained therein by the vacuum pump 3 to enable the alcohol to be volatilized and the beer dealcoholized at a low temperature, for instance about one hundred and fifteen degrees Fahrenheit (115° F.).

The steam jacket also has a high vacuum, for instance about 24 inches, maintained therein by vacuum pump 4 to keep the steam temperature low, for instance about one hundred and thirty-five degrees Fahrenheit (135° F.).

This steam temperature is sufficient to heat the beer immediately to the required temperature, as the steam on account of its high latent heat may impart heat at a high rate even under a low difference in temperature between the steam and the beer.

The vacuum pump 3 is connected to the receiver by pipe 18 and to the storage tank by pipe 19, and in addition to maintaining a high vacuum in the evaporator, also maintains such vacuum throughout the entire system and apparatus to facilitate the flow of beer therethrough and the removal of the gases and vapors therefrom.

The vacuum pump 4 is connected to the steam jacket by pipe 20 and while it is shown as connected to the bottom thereof, it may be connected at other places.

While the evaporator set forth herein is particularly appropriate for its purpose, other evaporators may be devised and employed in which the beer is heated only momentarily under a high vacuum and the heat is supplied by steam under a high vacuum or other agent which will deliver heat at a high rate under a low temperature.

The steam delivered to the steam jacket may be automatically regulated in amount by a steam regulator.

This regulator, which is diagrammatically illustrated and may assume any suitable form, has a steam valve 21 which is operated by an air motor 22, the action of which is controlled by an air controller 23 which has a thermometer 24 arranged within the steam jacket to respond to the temperature therein.

When the steam temperature decreases, the air controller causes the air motor to operate the steam valve to admit more steam, and when the temperature increases, the reverse action occurs.

Accordingly, the amount of steam is varied upon variations in the steam temperature.

If the flow of beer increases, the steam temperature falls and more steam is needed, and likewise if it decreases, the steam temperature rises and less steam is required.

The regulator acts under these changes in steam temperature to vary the amount of steam in accordance with the variations in the flow of the beer.

Cooler.

The cooler has a tank 25 in which is arranged a coiled or sinuous pipe 26 in which the dealcoholized beer is cooled.

The tank contains brine or other cooling liquid in which the coiled pipe is submerged.

The dealcoholized beer is cooled immediately after it leaves the evaporator so as to bring its temperature below that at which a detrimental action may commence upon its ingredients.

Auxiliary Apparatus.

The preheater and degasifier are both connected to a condenser in which the vapors from the evaporator and the degasifier are condensed.

The condensed vapor or distillate passes into the receiver and then may be delivered to the distillate tank.

The low volatile aromatics which are volatilized and liberated in the degasifier, are condensed in a dephlegmator arranged between the degasifier and the condenser, and the recovered aromatics pass into a collector.

These aromatics may be delivered to either the distillate tank or returned to the dealcoholized beer through a pipe 27 provided with a valve 28.

The pipes leading from the receiver and the collector are provided with valves which are normally closed but are opened to allow the condensed vapors or distillates to run into the distillate tank.

Of course, the auxiliary apparatus need not be employed so far as dealcoholizing the beer is concerned, as its purpose is merely to recover the substances and matters which are eliminated from the beer in the degasifier and evaporator.

Operation.

The beer flows continuously and rapidly through the apparatus and it is spread or diffused in the evaporator so a large quantity thereof may be dealcoholized in a given time under a given temperature and heat.

It is kept under a high vacuum to enable its alcohol to be removed at a low temperature.

The steam remains at a low temperature by being kept under a high vacuum, but its high latent heat which it delivers upon being condensed, enables it to impart heat at a sufficient rate to heat the beer practically instantaneously to the temperature required to volatilize and remove its alcohol.

Commercially, the dealcoholized beer has to have less than one-half of one per cent (.5%) alcohol by volume.

This apparatus will readily dealcoholize to that extent beer having two and one-half per cent (2½%) to five per cent (5%) alcohol.

The beer in being dealcoholized is concentrated due to the loss in alcohol, water and other ingredients, but as it is dealcoholized at a low temperature, the concentration may be as low as twenty per cent (20%) by volume.

Ordinarily the dealcoholized beer is diluted to restore the water which was lost by concentration during its dealcoholization, and various ingredients may be added thereto to give it a particular color and flavor or other characteristics.

The dealcoholized beer obtained by this apparatus and the process employed therein retains substantially the same color, flavor and characteristics of the original beer, as its ingredients do not undergo any material change in its being dealcoholized under the low temperature, and so it does not have to be subjected to any subsequent treatment to make it palatable.

In practice, if the apparatus has an evaporator with a heating wall about ten (10) feet in height and about nine (9) feet in diameter at its middle, it may be adjusted to dealcoholized beer having two and one-half per cent (2½%) to five per cent (5%) alcohol by volume at the rate of about nine hundred (900) gallons per hour.

In order to further explain the operation of this apparatus, the approximate vacuums, temperatures and results which may obtain therein are given below, but of course, these vacuums, temperatures and results may vary under different conditions:

*Vacuums.*

| | Inches. |
|---|---|
| Evaporator | 26½ |
| Steam jacket | 24 |

*Temperatures.*

| | Degrees Fahrenheit. |
|---|---|
| Beer in supply tank | 40 |
| Beer leaving preheater | 90 |
| Beer in degasifier | 90 |
| Beer entering evaporator | 90 |
| Steam in steam jacket | 135 |
| Dealcoholized beer leaving evaporator | 115 |
| Beer leaving cooler | 40 |
| Beer in storage tank | 40 |

*Results.*

Amount of beer dealcoholized, 900 gallons per hour.

Alcohol by volume in original alcoholic beer, 3.2%.

Alcohol by volume in dealcoholized beer, .4%.

Concentration of beer by volume in being dealcoholized, 20%.

What I claim is:

1. The herein described method of dealcoholizing an alcoholic beverage which consists in rapidly and uninterruptedly passing the beverage through a high vacuum and momentarily imparting heat thereto at a relatively high rate under a relatively low temperature while it is passing through the vacuum so as to volatilize and liberate alcohol practically instantaneously.

2. The herein described method of dealcoholizing an alcoholic beverage which consists in rapidly and uninterruptedly passing the beverage through a high vacuum, momentarily imparting heat thereto at a high rate under a low temperature while it is passing through the vacuum so as to volatilize and liberate alcohol practically instantaneously, and immediately removing the beverage from the heat.

3. The method of removing alcohol from alcoholic beverages which consists in preheating the beverage to about the temperature above which alcohol will be volatilized and liberated under a high vacuum, rapidly passing the beverage through a vacuum in an unretarded manner, momentarily and simultaneously imparting heat thereto at a high rate under a low temperature so as to volatilize and liberate alcohol practically instantaneously, and immediately reducing the temperature of the beverage to arrest the action of the heat thereon.

4. The method of removing alcohol from alcoholic beverages which consists in degasifying the beverage, rapidly and uninterruptedly passing the degasified beverage through a high vacuum, momentarily and simultaneously imparting heat thereto at a relatively high rate under a relatively low temperature so as to volatilize and liberate alcohol practically instantaneously, and immediately cooling the beverage.

5. The method of dealcoholizing an alcoholic beverage which consists in quickly passing the beverage through a high vacuum in an unretarded manner, momentarily and simultaneously imparting heat thereto at a high rate under a low temperature so as to volatilize and liberate alcohol practically instantaneously, and immediately reducing the temperature of the beverage.

6. The method of removing alcohol from alcoholic beverages which consists in raising the temperature of the beverage from its normal temperature to about the temperature above which the alcohol will be volatilized and liberated therefrom under a high vacuum, rapidly and uninterruptedly passing the beverage through a vacuum, momentarily and simultaneously imparting heat thereto at a high rate under a low temperature so as to volatilize and liberate alcohol practically instantaneously, and then immediately reducing the temperature of the beverage to about its normal temperature.

7. The method of dealcoholizing an alcoholic beverage which consists in degasifying the beverage, rapidly and uninterruptedly passing the degasified beverage in a dispersed condition through a high vacuum, and momentarily and simultaneously imparting heat thereto at a high rate under a low temperature so as to volatilize and liberate alcohol therefrom practically instantaneously under such vacuum.

8. The method of dealcoholizing beverages which consists in rapidly and uninterruptedly passing the beverage in a thin film or stream through a high vacuum, and momentarily and simultaneously imparting heat thereto at a high rate under a low temperature so as to volatilize and liberate alcohol therefrom practically instantaneously.

9. The herein described method of dealcoholizing an alcoholic beverage which consists in rapidly and uninterruptedly passing the beverage through a high vacuum, and momentarily imparting heat thereto at a high rate under a low and substantially constant temperature so as to volatilize and liberate alcohol therefrom practically instantaneously.

10. The herein described method of dealcoholizing an alcoholic beverage which consists in passing the beverage over a heated surface under a high vacuum, and momentarily imparting heat thereto from said surface at a high rate under a low temperature so as to volatilize and liberate alcohol therefrom practically instantaneously under such vacuum.

11. The method of removing alcohol from beverages which consists in bringing the beverage into contact with a heated surface under a high vacuum and momentarily imparting heat thereto from said surface at a high rate under a low temperature so as to volatilize and liberate alcohol therefrom practically instantaneously under such vacuum.

12. The method of removing alcohol from alcoholic beverages which consists in passing the beverage in a thin film or stream down an inclined wall of a vacuum chamber, and momentarily imparting heat thereto from said wall at a high rate under a low temperature so as to liberate alcohol therefrom practically instantaneously under a high vacuum.

13. The method of removing alcohol from alcoholic beverages which consists in bringing the beverage into contact with a heated surface in a vacuum chamber, momentarily imparting heat thereto from said surface at a high rate under a low temperature so as to volatilize and liberate alcohol therefrom practically instantaneously under a high vacuum, and maintaining said surface at a substantially constant low temperature which is substantially uniform throughout said surface.

14. The method of removing alcohol from alcoholic beverages which consists in rapidly passing the beverage over a heated surface in the form of a thin film, momentarily imparting heat thereto from said surface at a high rate under a low temperature so as to volatilize and liberate alcohol practically instantaneously under a high vacuum, and then immediately cooling the beverage.

15. The method of producing a dealcoholized beverage in which an alcoholic beverage rapidly passes through a high vacuum and has heat momentarily and simultaneously imparted thereto at a high rate under a low temperature.

16. The method of producing a dealcoholized beverage in which an alcoholic beverage is degasified and then rapidly passes through a high vacuum and has heat momentarily and simultaneously imparted thereto at a high rate under a low temperature.

17. The method of producing a dealcoholized beverage in which an alcoholic beverage rapidly passes through a high vacuum and has heat momentarily and simultaneously imparted thereto at a high rate under a low temperature and the dealcoholized beverage is then immediately and rapidly cooled.

18. The method of producing a dealcoholized beverage in which an alcoholic beverage is degasified and rapidly passes through a high vacuum and has heat momentarily and simultaneously imparted thereto at a high rate under a low temperature and immediately thereafter the dealcoholized beverage is rapidly cooled.

19. The method of producing a dealcoholized beverage in which an alcoholic beverage is preheated from its normal temperature to about its dealcoholizing temperature, then rapidly passes through a high vacuum and has heat momentarily and simultaneously imparted thereto at a high rate under a low temperature and immediately thereafter the dealcoholized beverage is rapidly cooled.

20. The method of producing a dealcoholized beverage in which an alcoholic beverage is preheated to about its dealcoholizing temperature and degasified and then passes rapidly through a high vacuum and has heat momentarily and simultaneously imparted thereto at a high rate under a low temperature and immediately thereafter the dealcoholized beverage is rapidly cooled.

21. The method of producing a dealcoholized beverage in which an alcoholic beverage rapidly passes through a high vacuum and has heat momentarily imparted thereto from steam at a low temperature under a vacuum.

22. The method of producing a dealcoholized beverage in which an alcoholic beverage rapidly passes through a high vacuum and has heat momentarily and simultaneously imparted thereto from steam at a low temperature under a vacuum and immediately thereafter the dealcoholized beverage is rapidly cooled.

23. The method of producing a dealcoholized beverage in which an alcoholic beverage is preheated and degasified, then rapidly passes through a high vacuum and has heat momentarily imparted thereto from steam at a low temperature under a vacuum and immediately thereafter the dealcoholized beverage is rapidly cooled.

24. The method of dealcoholizing an alcoholic beverage in which heat is momentarily imparted thereto at a high rate from steam, and a high vacuum is maintained on both the steam and the beverage.

25. The method of dealcoholizing an alcoholic beverage in which heat is momentarily imparted thereto from steam, a high vacuum being maintained on both the steam and the beverage, and the temperature of the beverage thereafter immediately reduced to arrest the action of the heat thereon.

26. The method of dealcoholizing an alcoholic beverage in which the beverage is preheated to about its dealcoholizing temperature, and then has additional heat momentarily imparted thereto from steam, a high vacuum being maintained on both the steam and the beverage.

27. The method of dealcoholizing an alcoholic beverage in which the beverage is degasified and has heat momentarily imparted thereto from steam, a high vacuum being maintained on both the steam and the beverage.

28. The method of dealcoholizing an alcoholic beverage in which the beverage is preheated to about its dealcoholizing temperature, then has additional heat momentarily imparted thereto from steam, a high vacuum being maintained on both the steam and the beverage, and the temperature of the beverage thereafter immediately reduced to arrest the action of the heat thereon.

29. The method of dealcoholizing an alcoholic beverage in which the beverage is preheated to about its dealcoholizing temperature, degasified, then has heat momentarily imparted thereto from steam, a high vacuum being maintained on both the steam and the beverage, and the temperature of the beverage thereafter immediately reduced to arrest the action of the heat thereon.

30. A process for dealcoholizing beer in which the beer is spread into a thin film and rapidly passed through a high vacuum and heat is simultaneously and momentarily imparted thereto at a high rate from steam under a high vacuum.

31. A process for dealcoholizing beverages in which the beverage is rapidly passed through a high vacuum and momentarily has its temperature raised by heat imparted thereto at a high rate from steam at a low temperature under a high vacuum.

In witness whereof I have hereunto subscribed my name.

WILLIAM B. UIHLEIN.